3,345,302
STABLE MIXTURES
David I. Netting, Swarthmore, and Helmut H. Weldes, Havertown, Pa., assignors to Philadelphia Quartz Company, Philadelphia, Pa., a corporation of Pennsylvania
No Drawing. Filed July 19, 1965, Ser. No. 473,195
12 Claims. (Cl. 252—181)

This invention relates to combinations of a material which forms acidic solutions in water and is coated with a film-forming synthetic copolymer soluble in alkaline solutions in a stable mixture with a particulate soluble silicate which will dissolve readily in water forming alkaline solutions having a pH greater than 8 whereby the alkali-soluble film is dissolved from the acidic reacting material which in turn dissolves, neutralizes the alkali and brings about activation and/or gelation of the soluble silica.

PRIOR ART

It is, of course, well-known to coat various materials in order to prevent attack by the atmosphere or other environmental conditions during storage and even to provide coatings which will be removed and permit desired reactions under specific circumstances.

For instance, Patent No. 1,692,996 to Richardson explains this broad principle of protection by a protective coating. Kirschenbauer, Patent No. 3,042,621, uses water dispersible coatings.

Relating more specifically to soluble silicates are the Patents Nos. 2,292,198–9 to J. D. Carter (see especially column 3, paragraph 2 of 2,292,198) which suggest coating a reactive material such as anhydrite with a soluble silicate.

However, none of these prior suggestions have provided combinations which formed dry mixtures of hygroscopic acidic solids and solube alkali silicates stable for long periods, such as a year or more, when protected from the acidic and aqueous components of the ambient atmosphere and could then be added to water to form a silica gel active for instance as a binder or coagulant aid for forming molds or for clarifying raw or waste waters, respectively.

Preliminary investigations showed that mixtures of uncoated solid acids and solid water soluble silicates are unstable in storage because the available solid acids are hygroscopic and very quickly take up some of the water of hydration which may be present in the solid alkali silicates making a damp mixture, and that they then attack the silicate to render it partly or completely insoluble. Furthermore, when such a dry mixture is added to water the acidic particles dissolve more rapidly than the soluble silicate causing the silica to precipitate instead of dissolving and then forming a gel on neutralization.

Many coatings soluble in neutral aqueous solutions were found to be neither protective nor slow dissolving. Apparently the films are permeable or too readily dispersed by slightly alkaline solutions below a pH of about 8. Some protective coatings were insoluble under the conditions of the solution and left particles of undissolved coating if by some means the coating was permeable or broken.

It became apparent to us that these two problems could be solved in one step, that is by coating the acid particles with a protective coating which does not dissolve or disperse in neutral water solution but dissolves readily in alkaline solution above a pH of 8, thus holding up the solution of the acidic component until the alkali silicate had dissolved and formed an alkaline solution into which the acidic salt is then released to form a homogeneously dispersed gel.

OUR INVENTION

We have now found that by using a unique group of resins which form films insoluble in water at a pH below 8, but which films become soluble in dilute alkaline solutions, we are able to coat the acid particles, mix them with solid alkali silicates, and store the stable compositions so prepared for long periods with no more protection than is usually required for such soluble alkali silicates alone, and then by adding water cause the solution of the alkali silicate which, in turn, after the silicate is substantially dissolved, releases the acidic component by removing the alkali soluble coating and the acid so released then reacts to form a silica gel which will bind any insoluble or inert particulate matter which may be present for the preparation of a mold or a more dilute solution will form activated silica gel effective as coagulant aids for the clarification of raw and waste waters. The coating is dissolved in the solution and does not disturb the treated water.

The compositions of our invention are dry and are stable for weeks and months. However, when these dry mixtures are added to water, the coating on the acid particles is insoluble until the alkali of the alkali silicate has substantially dissolved. The coating on the acid particles then slowly dissolves and releases the acid so that when the acid is completely dissolved and adjusts the pH to the desired point the silicate is also completely dissolved and dispersed. It is important that the silicate dissolve fast enough at the ambient temperature. For activated silica sols it is also important that the concentration of the silicate be adjusted so that lumps of gel do not form.

THE COMPONENTS

The acidic materials are any solids which will readily dissolve in water to form acid solutions having a pH below about 8. These may be acidic salts or metal salts, such as aluminum sulfate or iron chloride which hydrolyze to form acidic solutions. Alkali bisulfates or chlorides will be found useful.

Representative acidic materials are the solid organic acids and solid inorganic acids such as ammonium bisulfate, sodium bisulfate, sulfamic acid ($NH_2SO_3H$), and boric acid. Among the organic materials are citric acid, oxalic acid, tartaric acid and maleic anhydride.

Almost any solid acid can be used in our dry mixtures. However, we generally avoid acidic materials which are extremely hygroscopic. The organic acids are quite satisfactory but, of course, are more expensive than inorganic acidic salts.

The soluble alkali silicates may be any of the ordinary soluble alkali silicates such as the sodium, potassium or lithium silicates in solid form either as the spray dried materials, rapidly soluble glasses, or rapidly soluble crystals either hydrated or anhydrous such as the sodium metasilicate pentahydrate or anhydrous sodium metasilicate. In addition, there are silicate salts of organic alkalies which also readily dissolve and form soluble silicates in the aqueous solution. In preferred cases, the alkali will dissolve in one minute under the conditions of use.

Equivalent alkali silicates are those which form particulate solids which are readily soluble in water under the conditions of use; that is, if hot water is permissible the solids must be rapidly soluble in hot water, and if only cold water is permissible then the solids must be rapidly soluble in cold water, preferably in one minute. Thus in the sodium silicate system a hydrate with a ratio between 3.5 and 4 SiO$_2$:Na$_2$O is about the maximum whereas in the lithium silicate system ratios of 8

$$SiO_2:Li_2O$$

or more may be possible, and in the organic silicate systems very high oxide ratios, up to 16 or so, may be permitted.

Our invention also encompasses equivalent material such as the alkaline soluble sodium aluminates which might similarly be employed to react and form alumina gels and indeed the soluble aluminates may be used as the coated particles to react with the dissolved alkali silicates. Any such equivalent materials well-known in the art are, of course, included in our invention.

The requirements for the solid silicate depend on the application. For the preparation of activated silica sols, for instance, it is desirable that the solid silicate dissolve in water at room temperature in less than one minute. Thus a spray-dried sodium silicate having a ratio of 2 SiO$_2$:1Na$_2$O and containing about 17 to 25% of H$_2$O was quite satisfactory. Also, crystallized sodium tetraethanolammonium silicates worked very well.

THE FILMS

The coating materials employed in this invention are those which form films insoluble and undispersible in neutral or slightly alkaline aqueous solutions and/or acid solutions but which are soluble in solutions more alkaline than a pH of about 8. There are, for instance, the copolymers of maleic anhydride with an olefin containing 2 to 4 carbon atoms and having a copolymer molecular weight of 2500 to 70,000 and being esterified to the extent of 50 to 70% with a saturated aliphatic alcohol having from 1 to 4 carbon atoms such as are described in Patent No. 2,957,838. These form cross-linked polymeric coatings. Also included are copolymers of maleic anhydride with ethyl isopropyl and 2-ethyl hexylvinyl ether, such as were described in I & E Chem. 41, 1509 (1949). These interpolymers of vinylbutyl ethers with maleic anhydride form viscous solutions in ester and ketone solutions and do not dissolve in neutral water but rather in aqueous alkaline solutions. They are sometimes called Povimals. In this group a 45% partial methyl ester is water soluble but the half isobutyl ester produces films which are tack-free and insoluble in water at room temperature but are removable with an alkaline wash. More or less alkali-soluble but water insoluble films may be formed with the half esters of ethanol, normal propanol, isopropanol, secondary butanol and 1-decanol. The typical structural formula for a half ester of poly(methylvinyl ether/maleic anhydride) is as follows:

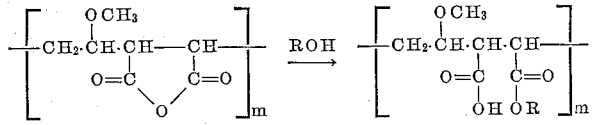

Water soluble polymers, such as the Carb-O-Waxes described as polymers of ethylene oxide with average molecular weights of 4,000 to 6,000 were neither protective nor slow dissolving.

The Armids, produced by Armour Industrial Chemical Co., are amides derived from fatty acids and are straight chain molecules insoluble in water but soluble in most organic solvents. They will coat acidic particles and permit protection of the solid silicate from premature attack by the acid, and they have some application in refractory bindings, but they cannot be used satisfactorily for preparation of activated silica sols since the film which is separated from the acid in the solution is insoluble in the alkaline solution and floats on the sol and is difficult to remove from the solution. To the extent that such insoluble residues do not interfere with the application, they may be considered equivalent films.

When the poly(methylvinyl ether/maleic anhydride) copolymer Gantrez AN-119 was used as a coating it appeared to be permeable and did not protect the particulate acid from the alkaline powder in storage and the particles of coated acid became very soft and wet. However, the partial esters produced films which were hard, tack-free, impermeable, insoluble in water at room temperature and non-reactive with acids or alkalies in the dry mixtures. These partial esters are readily dissolved in organic solvents and are thus readily coated on the acid particles.

Various methods of applying the coating to the acid are possible. The acidic particles may, for instance, be formed into small pellets and then coated by dipping in a solution of a coating material. The best method appears to be to spray a solution of a coating material directly on the acid powder as it is tumbled.

The more uniform the coating the less needs to be applied to protect the solid acid. For instance, with a very thin, uniform coating 1% of the coating material by weight of acid is effective. With less satisfactory methods of preparation, 3% to 10% of the coating per weight of the acid may be required.

The half or partial esters may be prepared as described in the art by mixing Gantrez AN with the desired alcohol and stirring the mixture at reflux temperature until the mixture turns clear. The half isobutyl ester requires 24 hours of refluxing and will dissolve only in a strongly alkaline solution. The half normal butyl ester will dissolve in a less alkaline solution and may be made by refluxing a 10% concentration of Gantrez AN-119, for instance, and n-butyl alcohol with a trace of concentrated sulfuric acid as a catalyst. The solution formed is clear, pale yellow, and slightly viscous. Excess alcohol may then be distilled off leaving a hard, brittle solid. A 15% solution of the half ester in acetone is satisfactory for coating the acid particles.

EXAMPLES

The following examples are given for the purpose of illustrating the invention and include the best mode contemplated by the inventors for carrying out their invention. They are not to be construed as limiting the invention which is defined in the claims. For instance, recognized additives such as anticaking agents may be included if desired.

Example 1

In this example a particulate acid powder is coated with the half n-butyl ester of Gantrez AN-119.

About 300 parts of the acid powder was tumbled in a cylindrical container turning on its axis. About 100 parts of a 15% solution of the half n-butyl ester of Gentrez AN-119 in acetone was sprayed on to the acid particles from an atomizer inserted through a hole in the top of the mill. A coating of about 3.4% by weight of the acid particles was obtained.

The acid particles may, on the other hand, be formed into pellets with a standard pellet maker and then coated either by dipping in the coating solution or by a similar spray operation.

Example 2

In this example an activated silica sol is prepared by preparing a mixture of the coated acid particles with soluble alkali silicate powders both being present in the amount to give a 3% SiO$_2$ concentration in the final sol at a pH value which would allow a gel time of 100 minutes. Pellets of NaHSO$_4$·H$_2$O as the acid were formed with the half n-butyl ester of Gantrez AN-119 and the final pellets were coated with the same ester. For example, a mixture of 4.92 parts of solid sodium tetraethanolammonium silicate was prepared with 2.02 parts of NaHSO$_4$·H$_2$O pellets coated as described. These mixtures were stable for a period of months and when dissolved in 50 parts by volume of water formed a solution containing 3.0% of SiO$_2$ at a pH of 10.6. This solution was aged according to the standard procedures for forming coagulant aids. After sufficient aging, the sol was diluted to 1% SiO$_2$ for storage and used in flocculation tests, according to the usual industrial procedure described in JAWWA 41, 551(1949). These jar tests were made with 60 p.p.m. of alum and 24 p.p.m. of SiO$_2$ in the form of the above-mentioned 1% SiO$_2$ solution. This product was found to be a very effective coagulant aid.

It must be emphasized that these activated silica sols prepared from the mixtures described in this application, especially those prepared from the sodium tetraammonium silicate, do not require aging to be effective. They give effective water treatment solutions as soon as they are dissolved. It is usually necessary to dissolve these mixtures in a relatively concentrated form before they are added to the turbid water. A certain concentration of acid and silica is needed to permit action of the acid on the silica and form an activated sol. If the solid mixture is dumped directly into the turbid water too much dilution occurs immediately and this effect cannot take place.

*Example 3*

In this example a number of acids and soluble silicates were used in a manner similar to the previous example.

In the table, silicate "A" is a solid silicate containing about 17% water and having a ratio of Na$_2$O:2SiO$_2$. "A" (22.4) is the same silicate but with a water content of about 22.4%. "B" is a special sodium silicate having a ratio of Na$_2$O:3·2SiO$_2$ and a water content of about 17%.

| Mix No. | Silicate | Amount (parts by wt.) | Acid | Amount (parts by wt.) | Gel Time, min. |
|---|---|---|---|---|---|
| 2 | A | 3.0 | NaHSO$_4$·H$_2$O | 2.0 | 60 |
| 3 | A | 3.0 | Sulfamic | 1.77 | 35 |
| 4 | A | 3.0 | Maleic Anhydride | 1.10 | 50 |
| 5 | A | 3.0 | ...do... | 1.10 | 75 |
| 6 | B | 2.67 | NaSHO$_4$·H$_2$O | 1.12 | 110 |
| 7 | A 22.4% water | 3.12 | NaSHO$_4$·H$_2$O | 2.0 | 90 |
| 8 | Sodium tetraethanol-ammonium silicate | 4.92 | NaHSO$_4$·H$_2$O | 2.0 | 25 |

These were all made up to form activated silica solutions at 3% SiO$_2$. Flocculation tests were made at 40 p.p.m. of alum and 16 p.p.m. SiO$_2$ and all of the mixtures gave active sols which were just as effective as the normal activated silica. They are fully active as soon as they are dissolved but lose some activity when aged beyond 50% of their gel life. The mixtures are readily adaptable to continuous application in a water treatment plant using a mechanical feeder to add the dry mixture to a water flow. All that is needed is that the water flow be sufficient in length for the solid mixture to dissolve before reaching the raw or waste water to be treated.

*Example 4*

More concentrated dry mixtures which will gel in a controllable way when mixed in water make satisfactory binders for refractories such as the backups for investment castings. A dry mixture of particulate alkali silicate and coated particulate acid when mixed with water dissolves quickly and will gel in a time which may be predetermined by the proportions employed. Sand or other refractory, inert matter may be mixed with the dry soluble alkali silicate and coated acid particles. For instance, a composition was made with 220 parts by weight of −325 mesh sand with 10 parts by weight of sodium tetraethanol-ammonium silicate described in the copending application of H. H. Weldes, Ser. No. 50,877, and 4 parts by weight of NaHSO$_4$·H$_2$O powder which had been coated as described above with half n-butyl ester of Gantrez AN–119. To this mixture of particulate solids was added 90 ml. of water at 25° C. using rather rapid mechanical stirring. After stirring for two or three minutes the mixture was poured into 1 inch molds. The mixtures were very thick but could be poured using the vibrating technique which did not cause water to separate. Setting occurred in about 15 minutes. After drying for 3 days at room temperature, the strengths of the molded refractory were good.

Similar compositions were prepared with 200 parts by weight of −325 mesh sand, 10 parts by weight of "A" sodium silicate described in Example 3, 5.9 parts by weight of beads of NaHSO$_4$·H$_2$O. The unfired strength of the molds from this mixture averaged 365 p.s.i. while the fired strength averaged 800 p.s.i. When the sodium bisulfate was replaced by 2.6 parts by weight of maleic anhydride the unfired strength was 200 p.s.i. and the fired strength was 634 p.s.i.

*Example 5*

There is a considerable demand for a satisfactory dry mold composition which can be merely mixed with water and used for casting refractory molds for dental work or for applications in the hobby field. Some of these applications will permit the presence of sodium, and in some of the more specialized applications in the dental field the refractory composition must be free of sodium. In the latter case, sodium-free organic ammonium silicates described in the copending application, Ser. No. 131,490, now U.S.P. 3,239,521 may be used. Such compositions should contain 10 to 20 parts of SiO$_2$ per hundred parts of solid mix and should be made up with from 16 to 25 parts by volume of water to provide a setting time of 10 to 15 minutes. The preparation of these molds requires careful balancing of the rate of solution of the soluble silicate which is determined by the ratio of alkali, either organic or inorganic silica, the temperature and the water content. If the acid dissolves before substantially all of the soluble silicate has dissolved, the silicate may be coated with gel and not dissolve completely, or the gel binder may not be evenly dispersed throughout the composition.

For example, a dry mixture of 15 g. spray dried organic ammonium silicate (mole ratio 7.5 SiO$_2$/tetraethanolammonium ion, 66.5% SiO$_2$, 28.4% tetraethanolammonium ion, 5% H$_2$O), 5 g. of coated maleic anhydride (5% by weight coated with ½ n-butylester of Gantrez AN–119, and 100 g. of −325 mesh Morgan Sand was mixed with 25 g. of water. The mixture was stirred by hand until it was smooth and uniform (about 5 minutes). This refractory mix solidifies on standing for about 15–30 minutes. It can be used to produce molds for dental castings.

*Example 6*

A mixture of solid crystallized sodium metasilicate pentahydrate with coated sodium bisulfate was stable in storage and could be used to form coagulant aids by addition as a powder to raw water, as described in Example 2. The mixture was made up in the proportion of 2.8 p.b.w. of Na$_2$SiO$_3$·5H$_2$O to 2.0 p.b.w. of NaHSO$_4$ coated with the half ester of decanol with the resin Gantrez 149 (the medium molecular weight poly-methyl-vinyl ether/maleic anhydride) having a specific viscosity of 1.5 to 2.0 when determined on a solution of 1 gram of copolymer in 100 ml. of methylethyl ketone at 25° C. An initial solution with about 2.5% SiO$_2$ was formed and used at about 50% of the gel time or gel life.

Example 7

In this example a dried particulate sodium silicate alkali was prepared by placing 45 parts of an air-separated dry kaolin clay in a muller and gradually adding dropwise or as a spray 30 parts of 41° Baumé sodium silicate solution having a ratio of $1Na_2O:3.22SiO_2$. The addition of the sodium silicate solution was regulated so as to avoid the development of a solid mix and permit the slow removal of the water from the sodium silicate and a continued coating of the particles of silicate and clay with additional clay. After the preparation of this dried particulate soluble sodium silicate was completed, a particulate acid in the form of sodium bicarbonate coated with the half cetyl ester of ethylene maleic anhydride copolymer, EMA–11, available from Monsanto Chemical Co., was mixed in by blending and without grinding. When this mixture was added to water in the proportion to provide 3% $SiO_2$ an active silica sol weighted with clay was obtained which was very effective in clarification of raw water.

Example 8

A variety of film forming resins were formed with a number of lower alkanols. All formed coatings insoluble in water but soluble in aqueous solutions having a pH above about 8. The EMA resins were obtained from Monsanto Chemical Co. and are linear copolymers of maleic anhydride with an olefin having 2 to 4 carbon atoms. EMA with a lower molecular weight has a viscosity of 2.0 cps. in a 2% solution while EMA 31 with a higher molecular weight has a viscosity of 7.0 cps. They were esterified with butyl alcohol in the usual manner by refluxing a 10% solution of the copolymer in the alcohol for about an hour until the mixture cleared. The residual alcohol was evaporated under vacuum leaving the half n-butyl ester.

The half iso butyl and half iso propyl esters of Gantrez AN–119 were made in the same way except that the half iso propyl ester required 30 hours of refluxing before it cleared up and the iso butyl ester required 12 hours.

Particulate sodium bisulfate was tumbled in a barrel and acetone solutions of the half esters were sprayed on the tumbling particles while the barrel was kept warm and compressed air was circulated to remove the acetone vapor. The half ester of EMA 31 was tacky and the mixture was kept cool to avoid "balling."

Mixtures of 2 parts by weight of the above coated sodium bisulfate and 3 parts by weight of the soluble silicate "A," described in Example 3, were formed and then used to form activated silica sols.

ACTIVATED SILICA SOLS PREPARED FROM SODIUM BISULFATE COATED WITH DIFFERENT HALF ESTERS

| Coating | Appearance of Sol |
| --- | --- |
| ½ n-butyl ester of Gantrez AN–119. | Silicate and coated acid completely dissolved in 2 min. Sol clear, medium amount of insoluble material. |
| ½ n-propyl ester of Gantrez AN–119. | Silicate and coated acid completely dissolved in 2 min. Sol clear, small amount of insoluble material. |
| ½ iso-butyl ester of Gantrez AN–119. | Silicate completely dissolved but only small amount of coated acid dissolved after 2 min. After 5 min. all of the coated acid also completely dissolved. Very clear sol, very small amount of insoluble material. |
| ½ n-butyl ester of EMA #11. | After 1 min. most of the silicate and coated acid appeared to have dissolved. After 5 min. the sol was very cloudy and there was definitely insoluble material. |
| ½ n-butyl ester of EMA #31. | After 1 min. the silicate had dissolved but the coated acid had stuck together into one lump. After 5 min. the coated acid had finally dissolved. The sol was slightly cloudy and there was a small amount of insoluble material. |

As can be seen from the above results, the ½ isobutyl ester of Gantrez AN–119 appears to make a better sol than the ½ n-butyl ester because ti requires a higher pH and more alkali before it becomes soluble, therefore the silica in the silicate has more time to completely dissolve. These sols all served adequately as coagulant aids.

UTILITY

These stable solid silicate-solid acid mixtures which gel in a controllable manner when mixed with water are useful for the preparation of instant activated silica sols, for bonding mixtures for secondary investment compositions, such as are used in dental work and for other types of refractory bonding.

It always has been very difficult to make sodium silicate set quickly as a binder for refractories. With these mixtures it is possible to control the set time over a very narrow range and water is the only liquid which has to be added.

More or less detailed claims will be presented hereinafter, and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine non-inventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents as well as changed proportions of the ingredients and additives such as anticaking agents, color indicators, wetting agents, or defoamers, which do not render the composition unsuitable for the disclosed purposes. Therefore, this application for Letters Patent is intended to cover all such modifications, changes and substitutions as would reasonably fall within the scope of the appended claims.

What we claim is:

1. A composition consisting essentially of an admixture of
    (a) a first particulate solid acidic compound material that is capable of dissolving in water to form an aqueous acidic solution, and
    (b) a second particulate material consisting essentially of a soluble silicate that is capable of dissolving in water to form an alkaline solution with a pH above 8; said first particulate material being coated with a film;
        (1) that consists essentially of an alkali soluble copolymer resin of maleic anhydride and a compound selected from the group consisting of alkylvinyl ethers and olefins containing 2–4 carbon atoms, said copolymer resin being 50–75% esterified with an alkanol having between 1 and 16 carbon atoms,
        (2) that is between about 1% and 10% by weight of the first particulate material, and
        (3) that is substantially insoluble in aqueous solutions having a pH less than 8,
    (c) the amount of the first particulate material being sufficient to neutralize the second particulate material.

2. A composition according to claim 1 wherein the olefin in section (1) is selected from the group consisting of ethylene, propylene, butylene and isobutylene.

3. A composition according to claim 1 wherein the alkylvinyl ether set forth in section (1) is selected from the group consisting of methyl vinyl ether, ethyl isopropyl vinyl ether, 2-ethylhexylvinyl ether, and vinyl butyl ether.

4. A composition according to claim 1 wherein said alkanol in section (1) contains between 1 and 4 carbon atoms.

5. The composition of claim 1 in which the lower alkanol is n-butanol.

6. The composition of claim 1 in which the lower alkanol is isobutanol.

7. The composition of claim 1 in which the copolymer resin is maleic anhydride with methylvinyl ether.

8. The composition of claim 7 wherein said copolymer is 50% esterfied with isobutyl alcohol.

9. The composition of claim 7 wherein said copolymer is 50% esterified with normal butyl alcohol.

10. The composition of claim 1 in which the copolymer resin has a molecular weight of 25,000 to 70,000.

11. A siliceous coagulant aid which is adapted to clarify raw or waste water which consists essentially of a water solution of the composition of claim 1.

12. A binder for a refractory composition consisting essentially of an admixture of the composition of claim 1, water and a refractory material.

References Cited

UNITED STATES PATENTS

| | | | |
|---|---|---|---|
| 1,692,996 | 11/1928 | Richardson | 252—384 |
| 2,217,466 | 10/1940 | Bayliss | 210—52 |
| 2,723,956 | 10/1955 | Johnson | 252—181 |
| 2,957,838 | 10/1960 | Mills | 260—28 |
| 3,029,151 | 4/1962 | Reuter et al. | 106—38.3 |
| 3,042,622 | 7/1962 | Kirschenbauer | 252—99 |
| 3,130,167 | 4/1964 | Green | 252—181 |

LEON D. ROSDOL, *Primary Examiner.*

W. E. SHULZ, *Assistant Examiner.*